United States Patent [19]

Staros

[11] 3,724,566

[45] Apr. 3, 1973

[54] DEVICE FOR ULTRASONIC BROACHING OF A GROUP OF HOLES

[76] Inventor: Filipp Georgievich Staros, Belgradskaya ulitsa, 18, kv. 226, Leningrad, U.S.S.R.

[22] Filed: Sept. 17, 1971

[21] Appl. No.: 181,411

[52] U.S. Cl. ............... 175/108, 51/59 SS, 83/687, 83/700, 83/701, 175/379
[51] Int. Cl. .................................................. E21c 3/02
[58] Field of Search ........ 83/618, 660, 177, 540, 582, 83/686, 687, 700, 701, 697, 698; 175/11, 16, 379, 108; 51/59 SS; 125/30 WD

[56] References Cited

UNITED STATES PATENTS

| | | | |
|---|---|---|---|
| 1,714,869 | 5/1929 | Haddow | 125/30 WD |
| 1,727,563 | 9/1929 | Ross | 175/379 |
| 3,248,981 | 5/1966 | Kafka | 83/620 X |
| 3,579,912 | 5/1971 | Panko et al. | 51/59 SS |

Primary Examiner—Andrew R. Juhasz
Assistant Examiner—Horace M. Culver
Attorney—Eric H. Waters et al.

[57] ABSTRACT

A device for ultrasonic broaching of a group of holes in articles made from hard and brittle materials by means of a wire tool which is fed periodically by a discrete feeding mechanism as the wires wear out, the holder of the wire tool being fashioned as plates of which one is provided with slots, each slot accomodating one wire.

3 Claims, 3 Drawing Figures

DEVICE FOR ULTRASONIC BROACHING OF A GROUP OF HOLES

The present invention relates to devices used for ultrasonic machining of articles and, more particularly, to devices for ultrasonic broaching of a group of holes.

The invention may be used for making small holes in microelectronics, for instance in the ferrite cards of small memory devices, as well as in articles made from ceramic, pyroceramic and other brittle and hard materials.

Known in the art are devices for supersonic broaching of a group of holes in articles made from hard and brittle materials by a wire tool which is essentially a plurality of wire pieces. The lower end portions of the pieces are cast with a fusible alloy, and the ends protrude from the cast body of the holder for over 0.5-2 mm, the number of the wires corresponding to that of the holes being broached. As they wear out, the wires are fed by the mechanism for discrete feeding.

The conventional devices for ultrasonic broaching of a group of holes are disadvantageous in that the wire tool quickly wears out, as a result of which it can be used for effecting only 5-10 broaching operations; besides, when replacing the tool the latter must be positioned rather precisely, which requires a lot of time; furthermore, use of different tools results in different shapes of the holes made in various cards.

It is an object of the present invention to provide a device for ultrasonic broaching of a group of holes, that would allow to effect practically an unlimited number of operations of simultaneous broaching of a group of holes.

Another object of the present invention is to provide a device for ultrasonic broaching of a group of holes, in which the tool would not require frequent replacement.

In accordance with the afore-said and other objects the subject-matter of the invention consists in that in a device for ultrasonic broaching of a group of holes in articles made from hard and brittle materials by a wire tool in which the number of wires corresponds to that of the holes being broached, said wires being fixed in a holder and fed as they wear out by means of a mechanism of discrete feeding, in accordance with the present invention, the holder is fashioned as two plates having an elastic washer disposed therebetween, and one of the plates has guide slots for accomodating a wire in each of them, one of the plates being made so that it can displace to clamp wires between the elastic washer and the plate provided with the slots.

It is expedient to dispose a washer made from a sheet material between the elastic washer and the plate provided with the slots.

The mechanism for discrete feeding of the wire tool may comprise a lever one of which arms has an arrangement for additional clamping of wires, disposed thereon.

This makes it possible to effect periodical feeding of all the wires simultaneously as the tool wears out, and to carry out practically an unlimited great number of operations.

Other objects and advantages of the present invention will become apparent from the following description of its exemplary embodiment and the accompanying drawings, in which.

Figure 1:
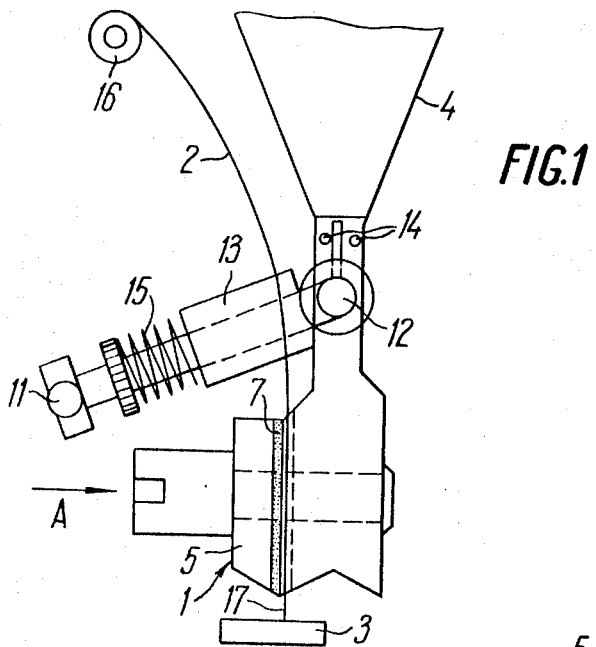
FIG. 1 shows a principal diagram of the device for ultrasonic broaching of a group of holes, according to the present invention.

A device for ultrasonic broaching of a group of holes in articles made from hard and brittle materials, comprises a wire tool 1 (FIG. 1) in which the number of wires 2 corresponds to that of the holes being broached in an article 3. The wires are fixed in a holder which, in its turn, is secured to a body 4 of the device.

Figure 2:
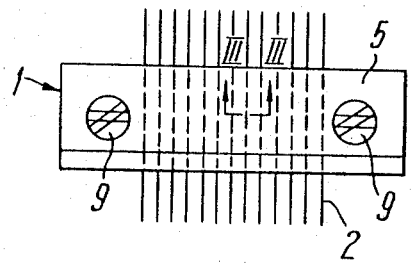
FIG. 2 is a view taken along arrow A in FIG. 1 at the wire tool, according to the present invention.
Figure 3:
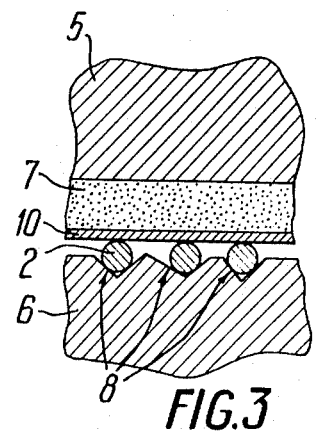
FIG. 3 is a section taken along line III—III of FIG. 2.

In accordance with the present invention the holder consists of two plates 5 and 6 (FIGS. 2 and 3) having an elastic washer 7 made, for instance from rubber, and disposed thereinbetween. The plate 6 is provided with guide slots 8 of which each accommodates one the wires 2. The slots may be rectangular, round, triangular or of any other shape. The plate 5 is made so that it can displace in the direction of the wires 2 clamping in the holder, said displacement being effected by means of screws 9 (FIG. 2). In order to provide a uniform pressure acting upon all the wires 2 (FIG. 3), an additional washer 10 made from a sheet material such as foil, is placed between the plates 5 and 6.

As the wires wear out, they are fed by the mechanism of discrete feeding, which comprises a lever 11 (FIG. 1) turning about an axle 12. Disposed on one arm of the lever 11 is an arrangement 13 for additionally clamping the wires 2, the other arm of the lever 11 thrusting against one of the stops 14. The arrangement 13 is spring-loaded by a spring 15.

The device functions as follows.

Prior to the beginning of the machining, the wires 2 would onto bobbins 16 (FIG. 1) are inserted into the guide slots 8 (FIG. 3) in such a manner that their working end portions 17 (FIG. 1) extend beyond the plates 5 and 6. Then, the plate 5 is displaced by the screws 9, and the wires 2 are pressed against the plate 6. Thereupon, the broaching of holes is effected in one of conventional ways.

If the working end portions 17 of the wires 2 are worn out, discrete feeding of the wires 2 is effected from the bobbins 16 over a strictly fixed length, for which purpose the lever 11 is raised until stop. Thereby, due to the fact that the arrangement 13 presses the wires 2 weaker than the plates 5 and 6, it slides upwards along the wires 2 over a distance on corresponding to that between the stops 14. Then, the screws 9 are loosened, thereby decreasing the force with which the wires 2 are clamped in the plates 5 and 6, and the lever 11 is lowered. The wires 2 that are fixed now only in the arrangement 13, are lowered to the surface of the article 3. After the wires 2 have contacted the surface of the article 2, the arrangement 13 slides along the wires downwards, provided the lever is still capable of being lowered. This design of the mechanism provides for differential feeding of each wire down to the surface of the article by taking into account the different degree of the wear-out of their working end portions.

With the screws 9 fixed, the tool 1 is again ready for operation.

In order to effect simultaneous broaching of several rows of holes, the tool is made composite and consists of a respective number of the plates 5 and 6, holder and arrangement 13 used for additional clamping of the wires 2.

The device for ultrasonic broaching of a group of holes, according to the present invention, does not require frequent replacement of the tool, provides for a quicker process of broaching, smaller differences in the shapes of holes of various articles and higher precision of disposition and parameters of holes, as well as a possibility of automatizing the process of manufacturing cards having holes needed for radioelectronic industry.

I claim:

1. In a device for ultrasonic broaching of a group of holes in articles made from hard and brittle materials, the improvement comprising a wire tool having wires for making holes in articles, the number of the wires corresponding to that of the holes to be broached; a holder in which said wires are fixed; said holder having two plates; one of said plates being made capable of displacing towards the second plate; the second plate having guide slots of which each accommodates one wire; an elastic washer disposed between said first and second plates; a means for displacing said first plate towards the second plate to clamp said wires between said elastic washer and second plate; and a mechanism for discrete feeding of wires into said holder as the wires wear out.

2. A device according to claim 1, which comprises a washer made from a sheet material and disposed between said elastic washer and second plate.

3. A device according to claim 1, in which the mechanism for discrete feeding of the wire tool comprises a lever and an arrangement for additional clamping of the wires, said arrangement being disposed on one of the arms of said lever.

* * * * *